(12) United States Patent
Kojenov et al.

(10) Patent No.: US 8,086,572 B2
(45) Date of Patent: Dec. 27, 2011

(54) METHOD, SYSTEM, AND PROGRAM FOR RESTORING DATA TO A FILE

(75) Inventors: Alexei Kojenov, San Jose, CA (US); Omar Bond Vargas, Port Orange, FL (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 10/814,431

(22) Filed: Mar. 30, 2004

(65) Prior Publication Data
US 2005/0229031 A1 Oct. 13, 2005

(51) Int. Cl.
G06F 7/00 (2006.01)
G06F 17/00 (2006.01)
G06F 15/173 (2006.01)

(52) U.S. Cl. ............... 707/681; 707/653; 709/225

(58) Field of Classification Search .......... 707/204, 707/205, 681, 653; 709/225
See application file for complete search history.

(56) References Cited

U.S. PATENT DOCUMENTS

| | | | | |
|---|---|---|---|---|
| 5,819,292 A * | 10/1998 | Hitz et al. ............... | 707/203 |
| 5,907,672 A | 5/1999 | Matze et al. | |
| 6,070,170 A * | 5/2000 | Friske et al. ............ | 707/202 |
| 6,098,074 A * | 8/2000 | Cannon et al. ........... | 707/200 |
| 6,253,300 B1 | 6/2001 | Lawrence et al. | |
| 6,457,015 B1 | 9/2002 | Eastham | |
| 6,574,591 B1 | 6/2003 | Hutchinson et al. | |
| 2001/0044807 A1 | 11/2001 | Kleiman et al. | |
| 2003/0065780 A1 * | 4/2003 | Maurer et al. ........... | 709/225 |
| 2003/0182326 A1 * | 9/2003 | Patterson ................. | 707/204 |
| 2003/0217082 A1 * | 11/2003 | Kleiman et al. ......... | 707/204 |

FOREIGN PATENT DOCUMENTS
EP 0566967 10/1993
WO 9500906 1/1995

OTHER PUBLICATIONS

"Logical vs. Physical File System Backup", by: Norman Hutchinson, published: 1999 http://www.usenix.org/publications/library/proceedings/osdi99/full_papers/hutchinson/hutchinson.pdf.*

"Logical vs Physical File System Backup", by: Norman Hutchinson, published 1999. http://www.usenix.org/events/osdi99/full_papers/hutchinson/hutchinson.pdf.*

"Logical vs Physical File System Backup", by: Norman Hutchinson, published 1999. http://www.usenix.org/events/osdi99/full_papers/hutchinson/hutchinson.pdf.*

(Continued)

*Primary Examiner* — Apu Mofiz
*Assistant Examiner* — Chelcie Daye
(74) *Attorney, Agent, or Firm* — William Konrad; Konrad Raynes and Victor LLP (57) ABSTRACT

Provided is a method, system and program for backing up the contents of a source storage device as an object in a data storage subsystem wherein the object contains image data representing the contents of the source storage device, and restoring the contents of the source storage device from the object to a file such as a flat file. The contents of the file may be copied to a target storage device to restore the contents of the source storage device from the file to the target storage device which may be the source storage device or another target storage device.

25 Claims, 6 Drawing Sheets

OTHER PUBLICATIONS

IBM Corp. "IBM Tivoli Storage Manager for UNIX. *Backup-Archive Clients Installation and User's Guide*." Version 5, Release 2, Fourth Editon., Apr. 2003. Title Page, Coypright Page, Table of Contents (pp. iii-vi), Chapter 4 (pp. 59-88) and Chapter 5 (pp. 89-107).

Command Reference, vol. 2, "dd Command," pp. 1-6 [online] [retrieved on Dec. 9, 2003]. Available from http://publibn.boulder.ibm.com/doc_link/en_US/a_doc_lib/cmds/aixcmds2/dd.htm.

Webopdia.com, "file," pp. 1-3 [online] [retrieved on Dec. 11, 2003]. Available from http://www.webopedia.com/TERM/f/file.html.

SearchWin2000.com Definitions, "file allocation table," pp. 1-3 [online] [retrieved on Dec. 11, 2003]. Available from http://searchwin2000.techtarget.com/sDefinition/0,,sidl_gci213956,00.html.

SearchDatabase.com Definitions, "flat file," pp. 1-2 [online] [retrieved on Dec. 11, 2003]. Available from http://searchdatabase.techtarget.com/sDefinition/0,,sid13_gci212131,00.html.

Webopedia.com, "format," pp. 1-3 [online] [retrieved on Dec. 11, 2003]. Available from http://www.webopedia.com/TERM/f/format.html.

What's.com *Target Search*, "format," pp. 1-3 [online] [retrieved on Dec. 11, 2003]. Available from http://whatis.techtarget.com/definition/0,,sid9_gci212141,00.html.

SearchStorage.com, "Ask the Expert: Questions and Answers," pp. 1-3 [online] [retrieved on Jan. 19, 2004]. Available from http://searchstorage.techtarget.com/ateQuestionNResponse/0,289625,sid5_cid539015_tax2....

Symantec. "*How to backup and restore an image to a mapped network drive with Norton Ghost 2003*," pp. 1-3 [online] [retrieved on Jan. 30, 2004]. Available from http://service1/symantec.com/SUPPORT/ghost.nsf/pfdocs/2002121010435125?Open.

Search Storage.com, "sector," pp. 1-3 [online] [retrieved on Dec. 11, 2003]. Available from http://searchstorage.techtarget.com/sDefinition/0,,sid5_gci212957,00.html.

* cited by examiner

METHOD, SYSTEM, AND PROGRAM FOR RESTORING DATA TO A FILE

BACKGROUND

1. Field

The present description relates to a method, system, and program for restoring data.

2. Description of Related Art

There are various known techniques for backing up data. These backup techniques are often implemented using a storage-management server which can store data "objects" in one or more locations often referred to as storage pools. A data object stored by the server may be a "file" which is a collection of data or information that has a name, typically referred to as the "filename" and is stored in a file system which organizes the files. There are a number of different types of files including data files, program files, text files, directory files, etc. Different types of files are used to store different types of information. For example, program files store programs, whereas text files store text. The storage-management server frequently uses a database for tracking information about the stored objects, including the attributes and locations of the objects in the storage pools.

The files to be backed up are usually located on one or more client stations coupled to the storage-management server over a network. One backup technique typically includes a "tape rotation" procedure, in which full, differential and incremental backups are made from a client station to a storage such as tape storage. Another approach which is used by some storage-management servers, such as the Tivoli Storage Manager™ (TSM™) product marketed by International Business Machines Corporation (IBM), utilizes a "progressive incremental" methodology, in which objects are backed up once from a client node and thereafter are typically not backed up again unless the object changes. In combination with the progressive incremental procedures, object-level policy rules may be used to control the retention time and the number of versions which are maintained for stored objects. For example, the storage-management server can be configured to retain an "active" version, that is, an object currently residing on the client node, and a specified number of inactive versions, that is, objects that once resided on the client node but have since been deleted or modified.

Should a user file originally stored on a client station become lost or corrupted, the backup copy of the file may be retrieved from the data storage subsystem and stored on the client station to replace the lost or corrupted file. In addition to user files, an "image" backup may also be performed which stores an image of the data stored on a "raw storage device." As used herein, a "raw storage device" refers to one or more storage units such as one or more "volumes."

In computers, a volume is an identifiable unit of data storage that is sometimes physically removable from the computer or storage system. In tape storage systems, a volume may be a tape cartridge or a tape reel). In other storage systems, a volume may be a removable hard disk. Each volume typically has a system unique name or number that allows it to be specified by a user. In some systems, a physical storage unit such as a magnetic disk drive may be divided into several separately identifiable volumes or separately identifiable partitions. Conversely, a volume may include more than one physical storage unit. For example, a Redundant Array of Independent Disks (RAID) volume may comprise several magnetic disk drives. Still further, the boundaries of a "logical volume" may not correspond to physical storage units. Instead, a logical volume may include storage units which are non-contiguous and may be scattered across several different physical storage units.

To prepare a storage device for storing files, the device is typically "formatted" by the operating system. For example, if the storage device is a magnetic disk drive, the operating system may test the disk sectors to identify and mark any bad sectors. In addition, the operating system typically creates a file system which usually includes a directory to organize files and an address table to locate the files stored within the disk drive. The file system directory and address table are typically stored within the storage device itself. Thus, if the formatted storage device is a volume, the file system directory and address table information identifying the location of the files are typically within the volume along with the user files stored within the volume.

When performing an image backup of a raw storage device such as a volume, typically, the entire contents of the volume is read and stored by the storage-management server as image data representing the entire contents of the volume. Thus, the contents stored as image data include not just the files stored within the volume but also any file system including the file directories and address tables of the volume. Should the user files or the file system stored on the source volume become corrupted or lost, the image data stored by the storage-management server may then be used to restore the entire contents of the source volume including the user files and file system, back to a target volume which may be the same source volume or a different volume of the same or larger size.

In addition to volumes, an image backup may be made of the contents of other types of raw storage devices including a disk slice or partition. A disk-shaped storage medium may be subdivided into physical portions, each of which is typically in the form of a concentric circle or track. Each track is typically divided into "sectors," each sector often representing the smallest unit of storage that is addressable for a read or write operation. Typically, a sector is 512 bytes in length. Thus, data can be located by identifying the concentric track and sector in which the data is stored.

Further improvements in data storage and restoration may be useful in a variety of applications.

SUMMARY OF ILLUSTRATED EMBODIMENTS

Provided is a method, system and program for backing up the contents of a source storage device as an object in a data storage subsystem wherein the object contains image data representing the contents of the source storage device, and restoring the contents of the source storage device from the object to a file such as a flat file. The contents of the file may be copied to a target storage device to restore the contents of the source storage device from the file to the target storage device which may be the source storage device or another target storage device.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof and which illustrate several embodiments. It is understood that other embodiments may be utilized and structural and operational changes may be made without departing from the scope of the present invention.

One aspect of the description provided herein concerns a storage management system, which may be embodied by various hardware components and interconnections. One example is shown by the storage management system 100 of FIG. 1. Broadly, the system 100 includes a data storage subsystem 102, one or more administrator stations 104, and one or more client stations 106. The subsystem 102 operates in response to directions of the client stations 106, as well as the administrator stations 104.

Figure 1:
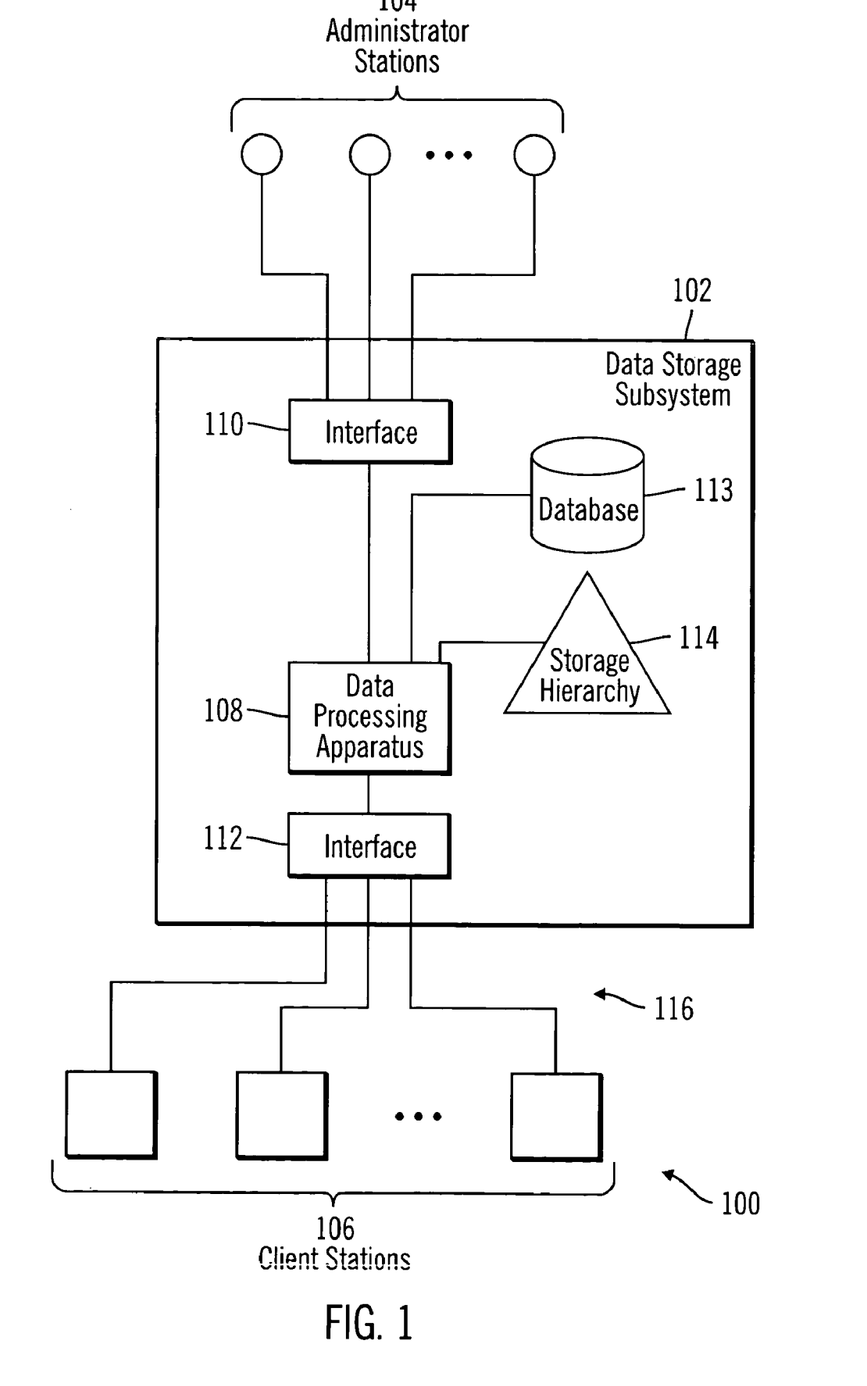
FIG. 1 illustrates an example of a computing environment in which aspects of the illustrated embodiments may be implemented.

The administrator stations 104 are used by system administrators to configure, monitor, and repair the subsystem 102. Under direction of an end user, the client stations 106 use the subsystem 102 to store and manage data on their behalf. More particularly, each client station 106 creates and regards data in the form of "user files". In this regard, each client station 106 separately employs the subsystem 102 to archive, backup, retrieve, and restore its user files. Accordingly, each user file is associated with a single client station 106, which is the source of that user file. In addition to backups of user files, image backups may be made for raw storage devices of each client station 106. As previously mentioned, a raw storage device may be a storage unit such as volume, partition, or disk slice, for example.

Each client station 106 may comprise any general purpose computer, such as an RS-6000 based workstation, Intel processor-based personal computer, mainframe computer, etc. The client stations 106 may comprise similar or different machines, running the similar or different operating systems. Some exemplary operating systems include AIX™, UNIX, OS/2, WINDOW™, etc.

The client stations 106 are interconnected to the subsystem 102 by a network 116. The network 116 may comprise any desired connection, including one or more conductive wires or busses, fiber optic lines, data communication channels, wireless links, internet connections, telephone lines, Storage Area Network (SAN), Local Area Network (LAN), Intranet, the Internet, Wide Area Network (WAN), etc. Preferably, a high speed communication channel such as a T3 link is used, employing a network protocol such as TCP/IP.

The administrator stations 104 comprise electronic equipment for a human or automated storage administrator to convey machine-readable instructions to the subsystem 102. Thus, the stations 104 may comprise processor-equipped general purpose computers or "dumb" terminals, depending upon the specific application.

In an exemplary embodiment, the data storage subsystem 102 may comprise a commercially available server such as an the Tivoli Storage Manager™ (TSM™) product distributed by IBM, which has been modified to operate in accordance with the description provided herein. However, since other hardware arrangements may be used as well, a generalized view of the subsystem 102 is discussed below.

The data storage subsystem 102 includes a data processing apparatus 108, having a construction as discussed in greater detail below. The data processing apparatus 108 exchanges signals with the network 116 and the client stations 106 via an interface 112, and likewise exchanges signals with the administrator stations 104 via an interface 110. The interfaces 110, 112 may comprise any suitable device for communicating with the implemented embodiment of client station and administrator station. For example, the interfaces 110, 112 may comprise ETHERNET cards, small computer system interfaces ("SCSIs"), parallel data ports, serial data ports, telephone modems, fiber optic links, wireless links, etc.

The data processing apparatus 108 is also coupled to a database 113 and a storage hierarchy 114 in which image data representing the contents of a raw storage device may be stored in one or more objects as records of in the database 113. In one aspect of the description provided herein, the data storage subsystem 102 can restore the image data, using the database objects, to a file in a file system, as well as to a target raw storage device, depending upon the particular application. As explained in greater detail below, such an arrangement may facilitate data restoration in a variety of circumstances.

In addition to image data, the storage hierarchy 114 is used to store selected user files from the client stations 106. The user files may be stored as individually or aggregated into managed files. The subsystem's storage of image data and user files may protect the contents of storage units on a client's machine from loss or corruption, assist the clients by freeing storage space at the client stations, and may also provide management of client data. In this respect, operations of the storage hierarchy 114 may include "archiving" data from the client stations 106, "backing up" data of the client stations 106 contained in the storage hierarchy 114, "retrieving" stored data for the client stations 106, and "restoring" data backed-up on the hierarchy 114.

The database 113 contains information about the image data objects and user files contained in the storage hierarchy 114. For example, as described in U.S. Pat. No. 6,098,074, this information may include the addresses at which image data objects are stored in the database in the storage hierarchy 114, various characteristics of the stored data, certain client-specified data management preferences, etc. The client information includes information relative to the client station 106 with which the image data is associated. In the one example, the client information is represented by "client number", "client type", and "source". For an image data object, the "client number" identifies the originating client station 106. This identification may include a numeric, alphabetic, alphanumeric, or other code. In this example, a numeric code is shown. The "client type" associates the client with one or more predetermined categories, such as different computer types, operating systems, communications parameters, etc. The "source" column lists a location in the client station 106 where the image data is stored locally by the client. As a specific example, an image source may comprise a partition of a storage drive in the client station.

Figure 2:
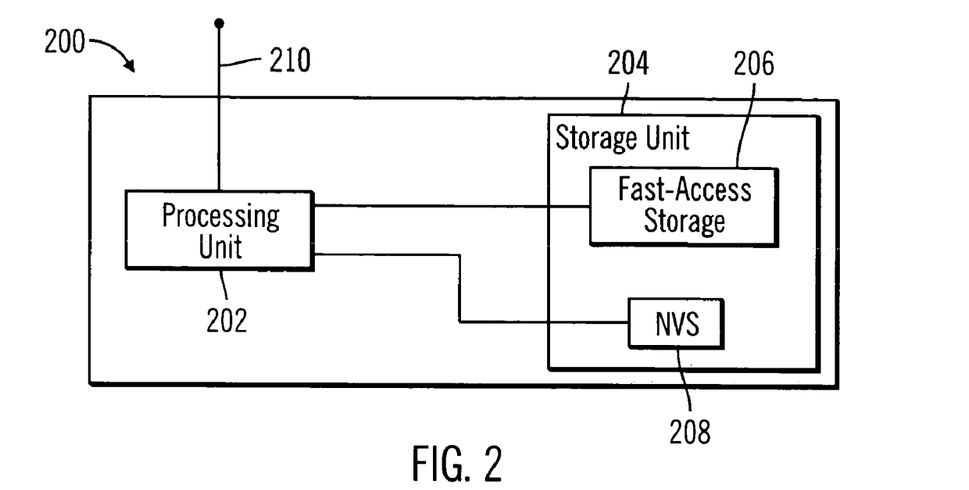
FIG. 2 is a schematic diagram of a digital data processing machine of the embodiment of FIG. 1.

The data processing apparatus 108 may be embodied by various hardware components and interconnections. FIG. 2 shows one example, in the form of a digital data processing apparatus 200.

The apparatus 200 includes a processing unit 202, such as a microprocessor or other processing machine, coupled to a storage unit 204. In the present example, the storage unit 204 includes a fast-access storage 206 as well as nonvolatile storage 208. The fast-access storage 206 preferably comprises random access memory, and may be used to store programming instructions executed by the processing unit 202. The nonvolatile storage 208 may comprise, for example, one or more magnetic data storage disks such as a "hard drive", a tape drive, or any other suitable physical storage device. The apparatus 200 also includes at least one input/output 210, such as a line, bus, cable, electromagnetic link, or other means for exchanging data between the processing unit 202 and other components of the subsystem 102.

Despite the specific foregoing description, ordinarily skilled artisans (having the benefit of this disclosure) will recognize that the apparatus discussed above may be implemented in a machine of different construction, without departing from the scope of the description provided herein. As a specific example, one of the components 206 or 208 may be eliminated; furthermore, the storage unit 204 may be provided on-board the processing unit 202, or even provided externally to the apparatus 200.

Figure 4:
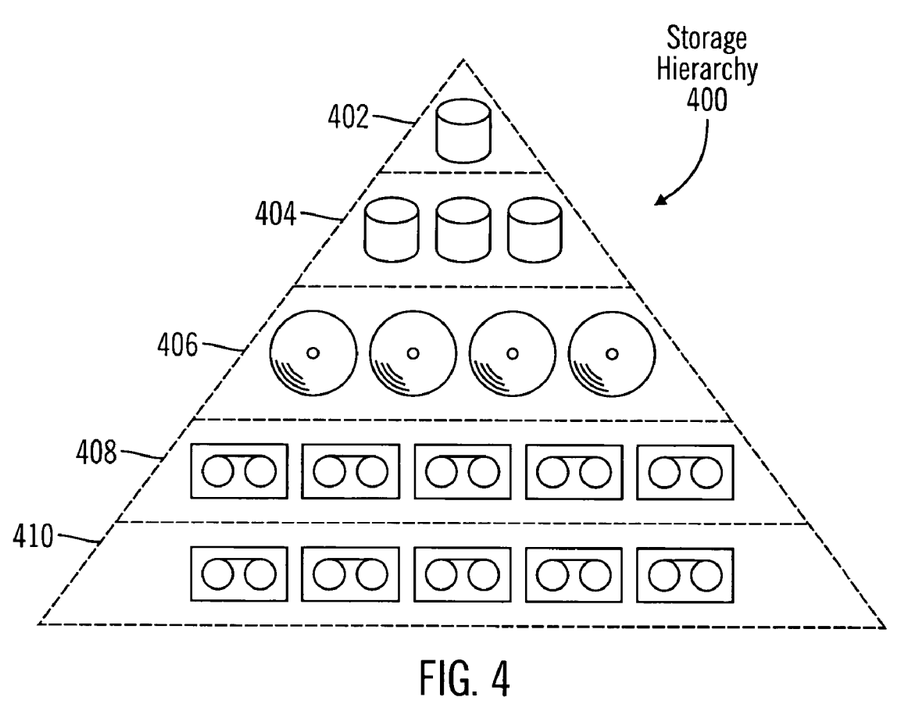
FIG. 4 is a schematic diagram showing the subcomponents of an illustrative storage hierarchy in accordance with described embodiments.

The storage hierarchy 114 may be implemented in storage media of various number and characteristics, depending upon the clients' particular requirements. To specifically illustrate one example, FIG. 4 depicts a representative storage hierarchy 400. The hierarchy 400 includes multiple levels 402-410, where successively higher levels represent incrementally higher storage performance. The levels 402-410 provide storage devices with a variety of features and performance characteristics.

In this example, the first level 402 includes high-speed storage devices, such as magnetic hard disk drives, writable optical disks, or other direct access storage devices ("DASDs"). The level 402 provides the fastest data storage and retrieval time among the levels 402-410, albeit the most expensive. The second level 404 includes DASDs with less desirable performance characteristics than the level 402, but with lower expense. The third level 406 includes multiple optical disks and one or more optical disk drives. The fourth and fifth levels 408-410 include even less expensive storage means, such as magnetic tape or another sequential access storage device.

The levels 408-410 may be especially suitable for inexpensive, long-term data archival, whereas the levels 402-406 are appropriate for short-term fast access data storage. As an example, one or more devices in the level 402 and/or level 404 may even be implemented to provide a data storage cache.

Devices of the levels 402-410 may be co-located with the subsystem 102, or remotely located, depending upon the user's requirements. Thus, storage devices of the hierarchy 400 may be coupled to the data processing apparatus 108 by a variety of means, such as one or more conductive wires or busses, fiber optic lines, data communication channels, wireless links, internet connections, telephone lines, SCSI connection, ESCON connect, etc.

Although not shown, the hierarchy 400 may be implemented with a single device type, and a corresponding single level. Ordinarily skilled artisans will recognize the "hierarchy" being used illustratively, since the description provided herein includes but does not require a hierarchy of storage device performance.

In the context of the storage hierarchy 114/400, the term "storage pool" is used to identify one or more storage devices with similar performance characteristics. For instance, the level 404 may be comprised of several storage pools, each pool including one or more DASDs.

Figure 5:
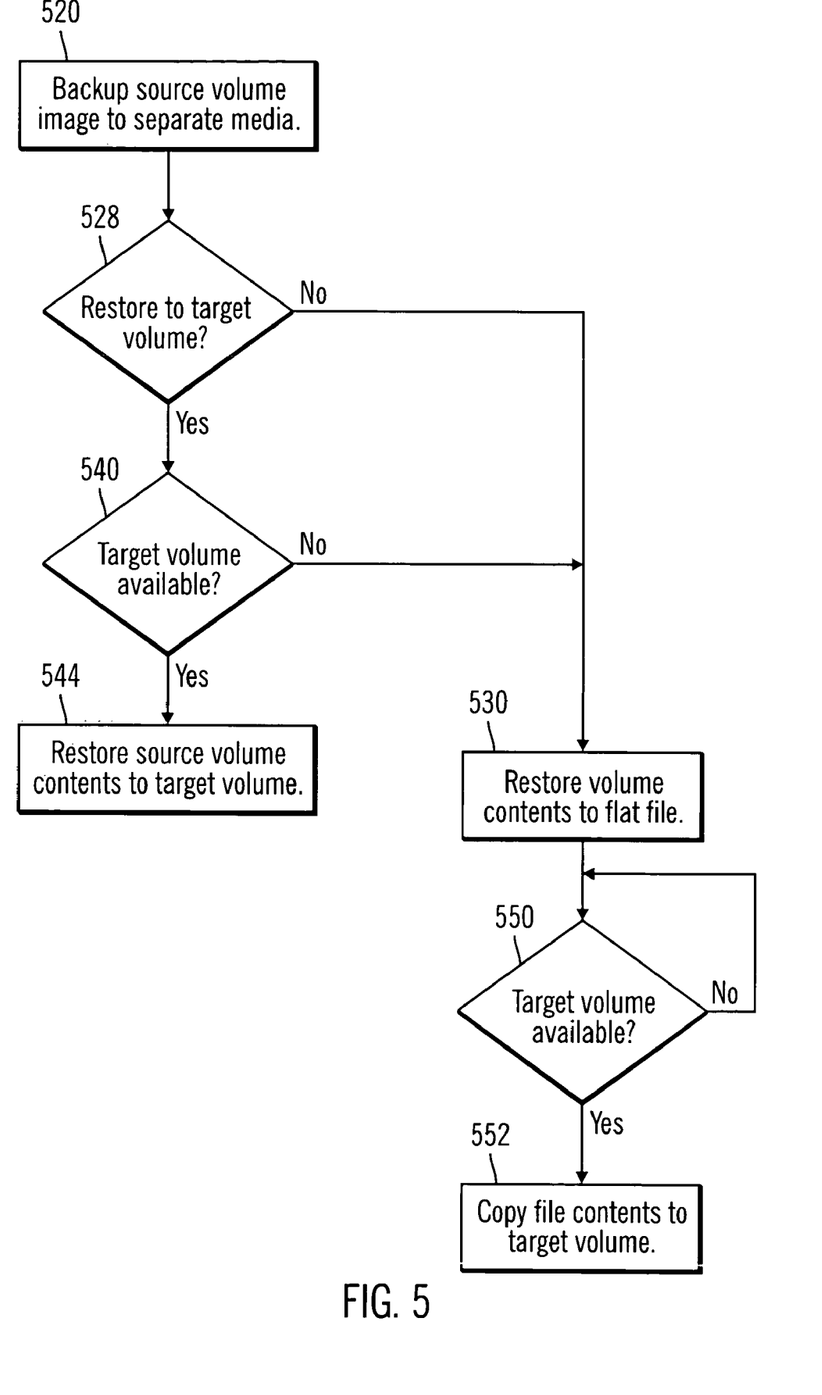
FIG. 5 shows illustrative operations of an example of a data storage subsystem in accordance with described embodiments.

FIG. 5 shows an example of operations of a data storage subsystem 102 which can restore image data from a source raw storage device to a file as well as to a target raw storage device, to facilitate data restoration operations. The image data is initially created by backing up (block 520) a source raw storage device to separate media. In the example of FIG. 5, the source raw storage device is a logical volume of one or more magnetic disk drives of a client station 106. The source logical volume is schematically represented by a volume 622 in FIG. 6. However, it should be appreciated that the source raw storage device may be other than a logical volume such as a partition, or disk slice as described above. The image data backed up from the source logical volume is stored in a database as one or more objects tracked by the database on a suitable storage unit 624 of the storage hierarchy 114. This may be a magnetic disk drive or tape drive, for example.

In one embodiment, prior to commencing the image backup operation, the source logical volume may be unmounted and then remounted as read-only so that the source logical volume is mounted but unavailable for write operations. Write operations to the source logical volume during the image backup may cause corruption of the contents of the source logical volume in some applications. Following completion of the image backup, the source volume may be remounted to permit write operations to the source logical volume. Alternatively, in some applications, by refraining from writing to the source logical volume during an image backup, unmounting and remounting may be reduced or eliminated.

In yet another embodiment, the image may be backed up to an object in the database in which the first object is designated the "original" object. Any changes to the data of the source volume during the image backup can be backed up to a second object in the database in which the second object is designated the "updated" object. Such an arrangement facilitates image backups without unmounting the source volume.

Figure 6:
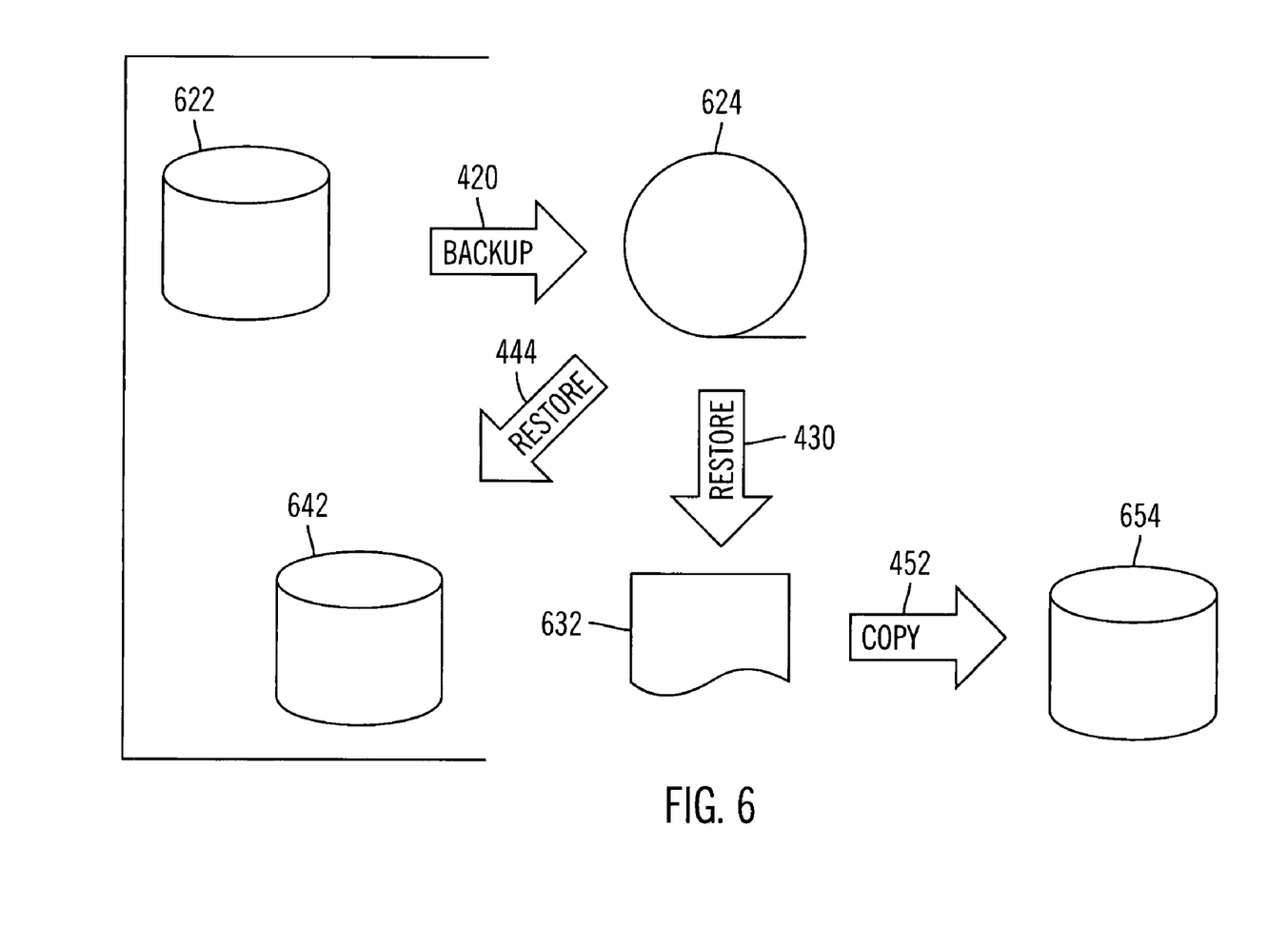
FIG. 6 illustrates an example of restoration of image backup data to a flat file in accordance with described embodiments.

In one aspect of the description provided herein, a restore operation utilizing the backup image data may be commenced without a target logical volume. For example, in a number of applications it may be useful to the backup image data contained within the database object or objects to a file prior to any attempt to restore the backup image data using the objects to a target logical volume. Thus, in the operations of FIG. 5, an inquiry is made (block 528) as to whether the restore operation is to be directed to a target logical volume. If not, the database objects image data representing the contents of the source logical volume 622 may be used to restore (block 530) the source volume contents directly to a flat file 632 as shown in FIG. 6. The restoration process uses the database objects containing the image data. As a result, the flat file 632 can contain the entire contents of the source logical volume 622 including the formatted file system of the source logical volume 622. If the source logical volume 622 contained only raw unformatted data without a file system, the flat file 632 can contain all of the raw data of the source logical volume 622.

In some applications, the flat file 632 may provide a temporary repository for the contents of the source volume 622. In other applications, a file such as the flat file 632 may be actively used. For example, in the LINUX operating system, a file may be mounted as a storage unit. Thus, the files stored within the flat file may be accessed for use by an administrator station 104 or a client station 106, for example, using the file system contained within the flat file 622.

In some applications, following an image backup of a source raw storage device, an image restore operation may be directed to a target raw storage device of a client station 106. This may occur for example, when the source raw storage device fails or the contents on the source raw device becomes corrupted or otherwise unavailable. Also, in some applications it may be appropriate to create a mirror image of the source raw device on a target raw storage device.

In the example of FIGS. 5 and 6, the source raw storage device is the source logical volume 622. If an image restore operation is to be directed (block 528) to a target logical volume, a determination (block 540) is made as to whether a suitable target logical volume is available. The target logical volume may be the source logical volume 622 itself or may be another target logical volume. Typically, the target raw storage device will have a size at least as large as the source raw storage. In the example of FIGS. 5 and 6, the target raw storage device is represented by a target logical volume 642 of a client station 106. If the target logical volume 642 is available (block 540) the entire contents of the source logical volume 622 may be restored to the target logical volume 642 in a conventional image restore operation (block 544) using the database objects containing the backup image data stored on the storage unit 624 in the storage hierarchy 114. For example, the backup image data stored on the storage unit 624 may be restored to the target logical volume 642 using the database objects in the manner utilized by the commercially available Tivoli Storage Manager™.

However, a target logical volume 642 may not be available (block 540) for a variety of reasons. For example, the client station 106 hosting the target logical volume 622 may be unreachable from the data storage subsystem 102 or the traffic on the network 116 may be too slow for a large restore operation. If so, the image data representing the contents of the source logical volume 622 may be restored (block 530) directly to a flat file 632 as discussed above, using the database objects containing the backup image data.

Still further, following an image restore operation to a target logical volume 642, it may be determined that some or all of the contents has been corrupted. This corruption may caused by a variety of factors. For example, the source logical volume 622 may have been already corrupted at the time of the image backup operation (block 520). Alternatively, the image restore operation (block 544) to the target logical volume 642 may have had an error. Yet another possibility is that the target logical volume had physical problems such as bad sectors which corrupted the data.

Thus, where the contents of the source logical volume 622 as restored to the target logical volume 642 contains corrupted data, the target logical volume 642 can be thought of as unavailable (block 540), and the image data stored on the storage device 624 in the form of database objects and representing the contents of the source logical volume 622, may be restored (block 530) directly to a flat file 632 as discussed above.

As previously mentioned, following the restore operation (block 530) to the flat file 632, the flat file 632 will contain the entire contents of the source logical volume 622 including the formatted file system (if any) of the source logical volume 622. Alternatively, if the source logical volume 622 contained only raw unformatted data lacking a file system, the flat file 632 will contain all of that raw data of the source logical volume 622.

Once a target logical volume becomes available (block 550), the contents of the flat file 632 may be copied (block 552) in a simple copy operation to a target logical volume such as the volume 654 (FIG. 6) which may be the same as the source logical volume 622 or a different logical volume. For example, the contents of the flat file 632 may be copied to the target logical volume 654 using the Unix "dd" copy command. Copy commands in other operating systems may be used as well.

Thus, if the target logical volume is unavailable (block 540) because, for example, the client station 106 hosting the target logical volume 622 or 642 is unreachable from the data storage subsystem 102 or the traffic on the network 116 is too slow for a large restore operation, the backup image data on the storage device 624 may be restored (block 530) using the database objects, to a flat file 632 at a different client station 106. The flat file 632 may be compressed if appropriate and stored on a portable medium such a compact disk or a tape cartridge and carried to the client station 106 hosting the target logical volume 622 or 642. The flat file 632 may then be uncompressed and copied to the target volume 622 or 642 by the client station hosting the target logical volume. In this manner, the entire contents of the source logical volume 520, including any file system contained within the source logical volume 520, may be restored to a target logical volume, via a file 632.

As another example, if the target logical volume 642 contains corrupted data following a restore operation (block 544) in which the backup image data on the storage device 624 is restored to the target logical volume 642 using the database objects, a flat file 632 may be used to assist in diagnosing the problem. For example, the backup image data may also be restored (block 530) to a flat file 632 using the database objects, and the flat file may be copied (block 552) to another target logical volume 654. If it is determined that the target logical volume 654 likewise contains corrupted data, it may be determined that the source logical volume 622 likely contained corrupted data prior to the image backup operation (block 520). If the target logical volume 654 is free of corrupted data, it may be determined that the source logical volume 622 was free of corrupted data and that either the target logical volume 642 likely contains one or more bad sectors or that an error occurred when the backup image data contained within the database objects stored on the storage device 624 was restored (block 544) to the target logical volume 642. Accordingly, the image restoration operation (block 544) may be repeated with another target logical volume. If the other target logical volume is determined to be free of data corruption after the backup image data is restored to the other target volume, it may be determined that the target logical volume 642 likely contains one or more bad sectors.

A "flat file" is a file containing one or more records that have no structured relationship amongst themselves. In the illustrated embodiment of FIG. 6, the flat file 632 contains a single record, that is, the image data of the entire contents of the source logical volume 622. It is appreciated that a flat file may contain multiple records wherein each record contains the image data of the contents of a different logical volume or other source raw storage device. It is further appreciated that the image data may be stored in a record of a file having other records and that such other records may have a structured relationship.

The flat file 632, as a file, can be assigned a filename, and can be stored in a storage device of a client station 106 or a storage device of the data subsystem 102. The storage device such as a volume which stores the flat file 632, can have a file system including a directory which identifies the name of the flat file 632 and organizes the files volume. The volume storing the flat file 632 may also have an address table which identifies the physical location of the flat file 632 within the volume storing the flat file 632.

Additional Implementation Details

The described techniques for managing resources may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

For example, in the context of FIGS. 1-2 the method aspect of the description provided herein may be implemented, by operating the data processing apparatus 108 (embodied by a digital data processing apparatus 200), to execute a sequence of machine-readable instructions. These instructions may reside in various types of signal-bearing media. In this respect, one aspect of the present description concerns a programmed product, comprising signal-bearing media tangibly embodying a program of machine-readable instructions executable by a digital data processor to perform a method of storing image data and restoring image data to a file and copying the file to a target device.

Figure 3:
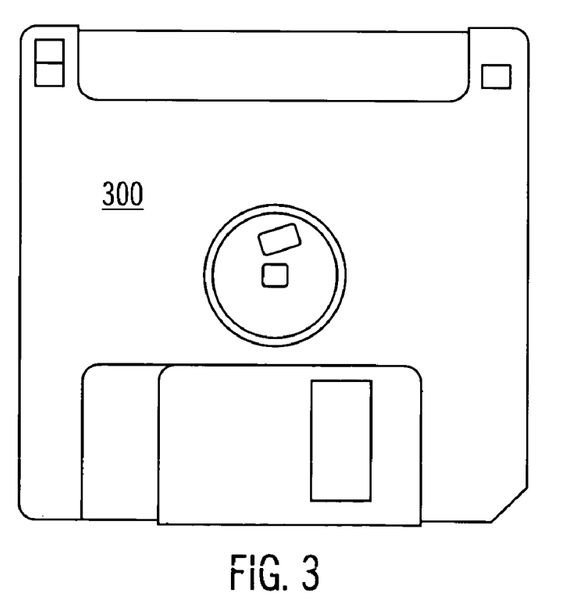
FIG. 3 shows an exemplary signal-bearing medium in accordance with described embodiments.

Illustratively, this signal-bearing media may comprise RAM contained within the data processing apparatus 108, as represented by the fast-access storage 206 for example. Alternatively, the instructions may be contained in another signal-bearing media, such as a magnetic data storage diskette 300 (FIG. 3), directly or indirectly accessible by the processing unit 202. Whether contained in the digital data processing apparatus 200 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C, C++, PLX, etc.

The illustrated logic of FIGS. 5, 6 show certain events occurring in a certain order. In alternative implementations, certain operations may be performed in a different order, modified or removed. Moreover, operations may be added to the above described logic and still conform to the described implementations. Further, operations described herein may occur sequentially or certain operations may be processed in parallel. Yet further, operations may be performed by a single processing unit or by distributed processing units.

Figure 7:
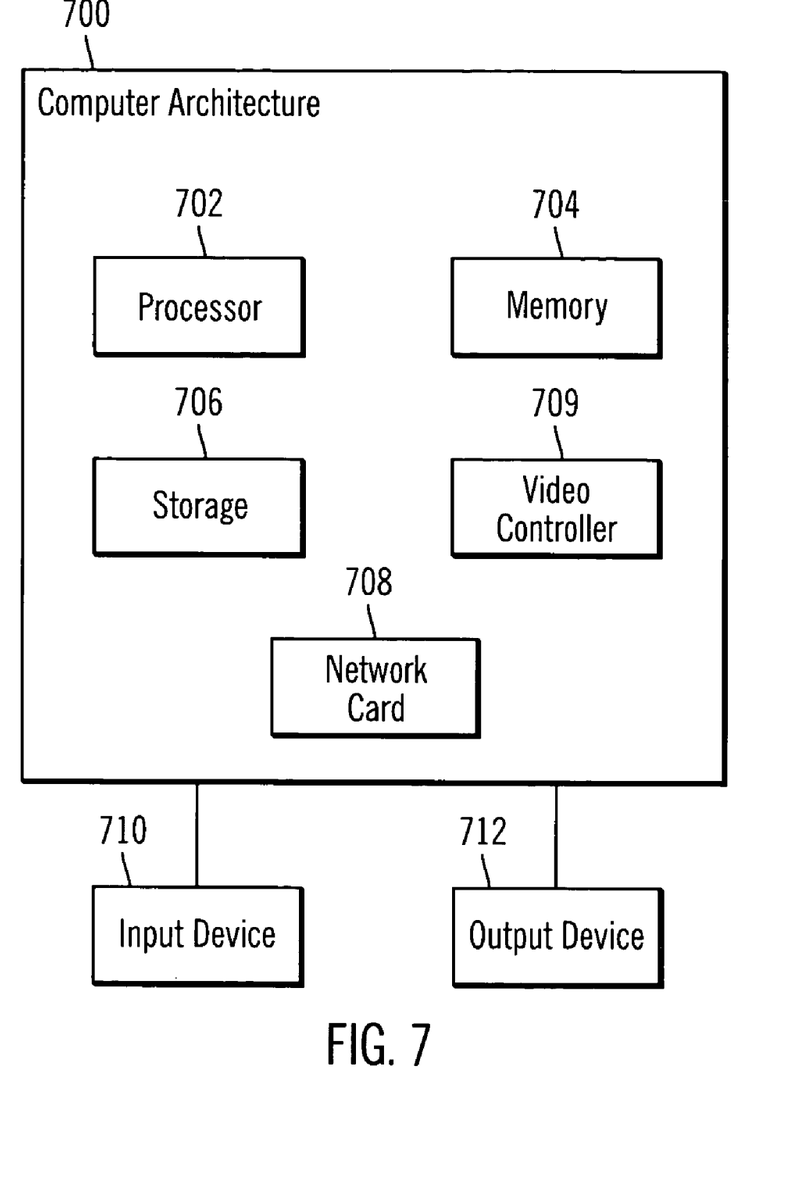
FIG. 7 illustrates an architecture of computing components in a network environment, such as the hosts, storage controllers, clusters, and any other computing devices.

FIG. 7 illustrates one implementation of a computer architecture 700 of the network components, such as the data storage subsystem 102, administrator stations 104 or client stations 106 shown in FIG. 1. The architecture 700 may include a processor 702 (e.g., a microprocessor), a memory 704 (e.g., a volatile memory device), and storage 706 (e.g., a nonvolatile storage, such as magnetic disk drives, optical disk drives, a tape drive, etc.). The storage 706 may comprise an internal storage device or an attached or network accessible storage. Programs in the storage 706 are loaded into the memory 704 and executed by the processor 702 in a manner known in the art. The architecture further includes a network card 708 to enable communication with a network. An input device 710 is used to provide user input to the processor 702, and may include a keyboard, mouse, pen-stylus, microphone, touch sensitive display screen, or any other activation or input mechanism known in the art. An output device 712 is capable of rendering information transmitted from the processor 702, or other component, such as a display monitor, printer, storage, etc.

The foregoing description of various implementations of the present disclosure has been presented for the purposes of illustration and description. It is not intended to be exhaustive or to limit the present description to the precise form disclosed. Many modifications and variations are possible in light of the above teaching. It is intended that the scope be limited not by this detailed description, but rather by the claims appended hereto.

What is claimed is:

1. A data management method, comprising:
   using an operating system, operating a source volume of a source device wherein the source volume includes storage, a plurality of user files stored in said storage and a file system for locating said user files stored in said storage, said file system including an address table identifying the location of each file on said storage device, said operating including said operating system locating said user files in said storage using said file system and said address table of said file system;
   backing up contents of the source volume of the source device at a first client station as at least one object of a database stored in a data storage subsystem wherein the at least one object represents an image of the contents of the source volume of the source device;
   using the database, tracking attributes and location of the at least one object in the database;
   providing a plurality of alternative targets for restoration of the source volume, said alternative targets including a target file and a target volume;
   receiving selection of one of said target file and target volume for restoration of the source volume;
   in response to selection of the target volume for restoration of the source volume, using the at least one object, restoring the contents of the source volume of the source device from the at least one object to the selected target volume instead of to a target file so that the target volume contains the restored contents of the source volume including said plurality of files of the source volume and said file system of the source volume;

in response to selection of the target file for restoration of the source volume, using the at least one object, restoring the contents of the source volume of the source device from the at least one object to at least one record of the selected target file in a file system stored on a storage device instead of to a target volume being operated as a volume by an operating system so that the at least one record of the target file contains internally within said at least one record of said target file, image data representing said contents of the source volume including image data representing both said plurality of files and said file system of the source volume within said at least one record of said target file;

using an operating system, using the target file containing the image data as a temporary repository for the contents of the source volume including the file system of the source volume, in which the target file has not been mounted to permit using the file system contained within the target file;

copying image data representing the contents of the source volume from the at least one record of the target file to a target volume of a target device so that the target volume contains the restored contents of the source volume including said plurality of files of the source volume and said file system of the source volume; and using an operating system, operating the target volume as a volume, including locating said user files in said target volume using said file system of said target volume.

2. The method of claim 1 wherein the target file is stored on storage media at a second client station.

3. The method of claim 1 wherein the target file is a flat file which contains in a single record of the flat file the image data representing the complete contents of the source volume.

4. The method of claim 1 wherein the data storage subsystem includes a server coupled to the first client station by a network.

5. The method of claim 1 further comprising, using the at least one object, restoring the contents of the source device from the at least one object to a target device so that the target device contains the contents of the source device.

6. The method of claim 1 further comprising mounting the source device as a read only device wherein write operations to said source device are prevented during said backing up of said source device.

7. The method of claim 1 wherein said target file is a flat file.

8. The method of claim 1 wherein said copying uses the UNIX dd command.

9. An article of manufacture for data management, comprising at least one of hardware and a combination of hardware and software, said at least one including machine readable instructions stored on the hardware that when executed, causes the machine to perform operations, the operations comprising:

using an operating system, operating a source volume of a source device wherein the source volume includes storage, a plurality of user files stored in said storage and a file system for locating said user files stored in said storage, said file system including an address table identifying the location of each file on said storage device, said operating including said operating system locating said user files in said storage using said file system and said address table of said file system;

backing up contents of the source volume of the source device at a first client station as at least one object of a database stored in a data storage subsystem wherein the at least one object represents an image of the contents of the source volume of the source device;

using the database, tracking attributes and location of the at least one object in the database;

providing a plurality of alternative targets for restoration of the source volume, said alternative targets including a target file and a target volume;

receiving selection of one of said target file and target volume for restoration of the source volume;

in response to selection of the target volume for restoration of the source volume, using the at least one object, restoring the contents of the source volume of the source device from the at least one object to the selected target volume instead of to a target file so that the target volume contains the restored contents of the source volume including said plurality of files of the source volume and said file system of the source volume;

in response to selection of the target file for restoration of the source volume, using the at least one object, restoring the contents of the source volume of the source device from the at least one object to at least one record of the selected target file in a file system stored on a storage device instead of to a target volume being operated as a volume by an operating system so that the at least one record of the target file contains internally within said target file, image data representing said contents of the source volume including image data representing both said plurality of files and said file system of the source volume within said at least one record of said target file;

using an operating system, using the target file as a temporary repository for the contents of the source volume including the file system of the source volume, in which the target file has not been mounted to permit using the file system contained within the target file;

copying image data representing the contents of the source volume from the at least one record of the target file to a target volume of a target device so that the target volume contains the restored contents of the source volume including said plurality of files of the source volume and said file system of the source volume; and using an operating system, operating the target volume as a volume, including using said operating system, locating said user files in said target volume using said file system of said target volume.

10. The article of manufacture of claim 9 wherein the target file is stored on storage media at a second client station.

11. The article of manufacture of claim 9 wherein the target file is a flat file which contains in a single record of the flat file the image data representing the complete contents of the source device.

12. The article of manufacture of claim 9 wherein the data storage subsystem includes a server coupled to the first client station by a network.

13. The article of manufacture of claim 9 wherein the operations further comprise:

using the at least one object, restoring the contents of the source device from the at least one object to a target device so that the target device contains the contents of the source device.

14. The article of manufacture of claim 9 wherein the operations further comprise:

mounting the source device as a read only device wherein write operations to said source device are prevented during said backing up of said source device.

15. The article of manufacture of claim 9 wherein said target file is a flat file.

16. The article of manufacture of claim 9 wherein said copying uses the UNIX dd command.

17. A subsystem for managing data for use with a plurality of client stations coupled together by a network, said client stations including a source client station having a source device and a target client station having a target device, each source device having a source volume which includes storage, a plurality of user files stored in said storage and a file system for locating said user files stored in said storage, said file system including an address table identifying the location of each file on said storage device, comprising:
 a data storage device having a database comprising a plurality of objects;
 a digital data processing apparatus coupled to the storage device, wherein the digital data processing apparatus includes an operating system and is programmed to perform data management operations, said operations comprising:
  using the operating system, operating a source volume of a source device including said operating system locating said user files in said storage using said file system and said address table of said file system;
  backing up contents of the source volume of the source device at a source client station as at least one object of said database stored in said data storage device wherein the at least one object represents an image of the contents of the source volume of the source device;
  using the database, tracking attributes and location of the at least one object in the database;
  providing a plurality of alternative targets for restoration of the source volume, said alternative targets including a target file and a target volume;
  receiving selection of one of said target file and target volume for restoration of the source volume;
  in response to selection of the target volume for restoration of the source volume, using the at least one object, restoring the contents of the source volume of the source device from the at least one object to the selected target volume instead of to a target file so that the target volume contains the restored contents of the source volume including said plurality of files of the source volume and said file system of the source volume;
  in response to selection of the target file for restoration of the source volume, using the at least one object, restoring the contents of the source volume of the source device from the at least one object to at least one record of the selected target file in said file system stored on a target device of a target client station instead of to a target volume being operated as a volume by an operating system so that the target file contains internally within said at least one record of said target file, image data representing said contents of the source volume including image data representing both said plurality of files and said file system of the source volume within said at least one record of said target file;
  using an operating system, using the target file as a temporary repository for the contents of the source volume including the file system of the source volume, in which the target file has not been mounted to permit using the file system contained within the target file;
  copying image data representing the contents of the source volume from the at least one record of the target file to a target volume of a target device of a target client station so that the target volume contains the restored contents of the source volume including said plurality of files of the source volume and said file system of the source volume; and
  using an operating system, operating the target volume as a volume, including using said operating system, locating said user files in said target volume using said file system of said target volume.

18. The subsystem of claim 17 wherein the target file is stored on a target device of a target client station different from said source client station.

19. The subsystem of claim 17 wherein the target file is a flat file which contains in a single record of the flat file the image data representing the complete contents of the source volume.

20. The subsystem of claim 17 wherein the digital data processing apparatus includes a server coupled to the first client station by said network.

21. The subsystem of claim 17 wherein said operations further comprise:
 further comprising, using the at least one object, restoring the contents of the source device from the at least one object to a target device so that the target device contains the contents of the source device.

22. The subsystem of claim 17 wherein said operations further comprise:
 mounting the source device as a read only device wherein write operations to said source device are prevented during said backing up of said source device.

23. The subsystem of claim 17 wherein said target file is a flat file.

24. The subsystem of claim 17 wherein said copying uses the UNIX dd command.

25. A data management method, comprising:
 using an operating system, operating a source volume of a source device wherein the source volume includes storage, a plurality of user files stored in said storage and a file system for locating said user files stored in said storage, said file system including an address table identifying the location of each file on said storage device, said operating including said operating system locating said user files in said storage using said file system and said address table of said file system;
 mounting the source device as a read only device wherein write operations to said source device are prevented during backing up of said source device;
 backing up the complete contents of the source volume of the source device at a first client station as at least one object of a database stored in a data storage subsystem which includes a server coupled to the first client station by a network wherein the at least one object represents an image of the contents of the source volume of the source device;
 using the database, tracking attributes and location of the at least one object in the database;
 providing a plurality of alternative targets for restoration of the source volume, said alternative targets including a flat target file and a target volume;
 receiving selection of one of said flat target file and target volume for restoration of the source volume;
 in response to selection of the target volume for restoration of the source volume, using the at least one object, restoring the contents of the source volume of the source device from the at least one object to the selected target volume instead of to a target file so that the target volume contains the restored contents of the source volume including said plurality of files of the source volume and said file system of the source volume;

in response to selection of the flat target file for restoration of the source volume, using the at least one object, restoring the contents of the source volume of the source device from the at least one object to a single record of the selected flat target file in a file system stored on a storage device at a second client station instead of to a target volume being operated as a volume by an operating system so that the single record of the flat target file contains internally within said single record of the flat target file, image data representing said complete contents of the source volume including image data representing both said plurality of files and said file system of the source volume within the contents of the single record of the flat target file;

using an operating system, using the flat target file as a temporary repository for the contents of the source volume including the file system of the source volume, in which the flat target file has not been mounted to permit using the file system contained within the flat target file;

copying image data representing the complete contents of the source volume from the single record of the flat target file using the UNIX dd command to a target volume of said target device when available so that the target volume contains the complete restored contents of the source volume including said plurality of files of the source volume and said file system of the source volume; and using an operating system, operating the target volume as a volume, including using said operating system, locating said user files in said target volume using said file system of said target volume.

* * * * *